(12) United States Patent
Jhaveri

(10) Patent No.: US 11,881,216 B2
(45) Date of Patent: Jan. 23, 2024

(54) SYSTEM AND METHOD FOR CONVERSATION AGENT SELECTION BASED ON PROCESSING CONTEXTUAL DATA FROM SPEECH

(71) Applicant: Bank of America Corporation, Charlotte, NC (US)

(72) Inventor: Rajan Jigish Jhaveri, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 17/341,565

(22) Filed: Jun. 8, 2021

(65) Prior Publication Data
US 2022/0392445 A1   Dec. 8, 2022

(51) Int. Cl.
| | | |
|---|---|---|
| *G10L 15/00* | (2013.01) | |
| *G10L 15/22* | (2006.01) | |
| *G10L 15/08* | (2006.01) | |
| *G10L 15/02* | (2006.01) | |
| *H04L 67/63* | (2022.01) | |

(52) U.S. Cl.
CPC ............... *G10L 15/22* (2013.01); *G10L 15/02* (2013.01); *G10L 15/08* (2013.01); *H04L 67/63* (2022.05); *G10L 2015/088* (2013.01); *G10L 2015/223* (2013.01); *G10L 2015/225* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/1822; G10L 15/183; G10L 15/193; G10L 15/19; G10L 15/14; G10L 15/197; G10L 15/1815
See application file for complete search history.

(56) References Cited

U.S. PATENT DOCUMENTS

| | | |
|---|---|---|
| 8,250,192 B2 | 8/2012 | Bowerman |
| 8,738,739 B2 | 5/2014 | Makar et al. |
| 10,019,983 B2 * | 7/2018 | Ganapathiraju ........ G10L 15/01 |
| 10,303,773 B2 | 5/2019 | Curtis et al. |
| 10,498,898 B2 | 12/2019 | Mazza et al. |
| 10,515,635 B2 | 12/2019 | Horling et al. |
| 10,565,634 B2 | 2/2020 | Talmor et al. |
| 10,599,885 B2 | 3/2020 | Galitsky |
| 10,600,409 B2 | 3/2020 | Eidem et al. |
| 10,617,959 B2 | 4/2020 | Liu et al. |
| 10,678,516 B2 | 6/2020 | Myung et al. |
| 10,742,572 B2 | 8/2020 | Anderson et al. |
| 10,757,044 B2 * | 8/2020 | Fawcett .............. G06F 16/3329 |
| 10,771,408 B2 | 9/2020 | Lim et al. |
| 10,776,580 B2 | 9/2020 | Kim et al. |

(Continued)

*Primary Examiner* — Vu B Hang

(57) ABSTRACT

A system for identifying computer agents to perform a particular task requested by a user, receives an audio signal to perform the particular task. The system extracts a set of features from the audio signal. The set of features represents at least a first keyword indicating the particular task. The system determines which one or more computer agents from a plurality of computer agents is predetermined to perform the particular task by comparing the first keyword with a plurality of keywords associated with the plurality of keywords. The system determines a first computer agent associated with a second keyword that corresponds to the first keyword. The system executes the first computer agent to perform the particular task.

17 Claims, 2 Drawing Sheets

(56) References Cited

U.S. PATENT DOCUMENTS

| | | |
|---|---|---|
| 10,795,940 B2 | 10/2020 | Choi et al. |
| 10,817,265 B2 | 10/2020 | Collins |
| 10,832,008 B2 | 11/2020 | Banerjee et al. |
| 10,838,967 B2 | 11/2020 | Wang et al. |
| 10,847,155 B2 | 11/2020 | Zhou |
| 10,860,802 B2 | 12/2020 | Cristian et al. |
| 10,938,858 B2 | 3/2021 | Filar et al. |
| 10,951,552 B2 | 3/2021 | Jafar Ali et al. |
| 10,992,718 B2 | 4/2021 | Baer et al. |
| 2012/0260263 A1 | 10/2012 | Edoja |
| 2014/0122056 A1 | 5/2014 | Duan |
| 2014/0122083 A1 | 5/2014 | Xiaojiang |
| 2014/0122407 A1 | 5/2014 | Duan |
| 2014/0122618 A1 | 5/2014 | Duan |
| 2014/0122619 A1 | 5/2014 | Duan |
| 2014/0164296 A1 | 6/2014 | Duan |
| 2014/0279050 A1 | 9/2014 | Makar et al. |
| 2016/0308795 A1 | 10/2016 | Cheng et al. |
| 2018/0052826 A1 | 2/2018 | Chowdhary et al. |
| 2018/0082184 A1 | 3/2018 | Guo et al. |
| 2018/0129181 A1 | 5/2018 | Kratzer, III et al. |
| 2018/0131645 A1 | 5/2018 | Magliozzi et al. |
| 2018/0247352 A1 | 8/2018 | Rogers et al. |
| 2019/0013017 A1 | 1/2019 | Kang et al. |
| 2019/0124020 A1 | 4/2019 | Bobbarjung et al. |
| 2019/0158433 A1 | 5/2019 | Yun et al. |
| 2019/0171758 A1 | 6/2019 | Pinel et al. |
| 2019/0188590 A1 | 6/2019 | Wu et al. |
| 2019/0199657 A1 | 6/2019 | Fawcett et al. |
| 2019/0199658 A1 | 6/2019 | Kim et al. |
| 2019/0311036 A1 | 10/2019 | Shanmugam et al. |
| 2019/0392285 A1 | 12/2019 | Manaharlal Kakkad et al. |
| 2020/0150839 A1 | 5/2020 | Roisman et al. |
| 2020/0285660 A1 | 9/2020 | Kim et al. |
| 2021/0035576 A1 | 2/2021 | Kang et al. |
| 2021/0133234 A1 | 5/2021 | Bedadala et al. |

\* cited by examiner

SYSTEM AND METHOD FOR CONVERSATION AGENT SELECTION BASED ON PROCESSING CONTEXTUAL DATA FROM SPEECH

TECHNICAL FIELD

The present disclosure relates generally to data processing, and more specifically to system and method for conversation agent selection based on processing contextual data from speech.

BACKGROUND

In a messaging environment that supports conversational messaging, for example, through the use of a conversation agent or "chatbot," variations of user requests from the conversational agent increase. Not every conversation agent is configured to perform every task requested by a user. Often a conversation agent cannot understand a particular task requested by the user and/or may not be configured to perform the particular task. Current audio signal processing technologies are not configured to provide a reliable and efficient solution for conversation agent selection for performing different tasks.

SUMMARY

Current audio signal processing technologies are not configured to provide a reliable and efficient solution for conversation agent selection for performing different tasks. This disclosure contemplates systems and methods for conversation agent selection for performing different tasks based on processing extracted contextual data from speech.

In some cases, not every conversation agent (e.g., computer agent) may be configured to perform every task, e.g., requested by a user. Thus, a primary conversation agent (e.g., primary computer agent) may be implemented to predict and select one or more computer agents to perform a particular task. In this disclosure, conversation agent and primary conversation agent may be interchangeably referred to as computer agent and primary computer agent, respectively.

This disclosure contemplates configuring each of a plurality of computer agents to perform a different task. Each computer agent may further be configured to converse with a user. For example, a first subset of computer agents from the plurality of computer agents may be associated with a first task domain, such as accounting. Within the first subset of computer agents, each computer agent may be configured to perform a different task related to or associated with a specific field in accounting. Thus, if the user requests the disclosed system to perform a task related to a specific field in accounting, the disclosed system selects one or more computer agents from the first subset of computer agents that are predetermined to perform the task related to the specific field in accounting. For example, the selected computer agents may answer a question user has asked related to the specific field in accounting. In another example, a second subset of computer agents from the plurality of computer agents may be associated with a second task domain, such as web development. Within the second subset of computer agents, each computer agent may be configured to perform a different task related to or associated with web development, such as front-end web development, back-end web development, etc. Thus, if the user requests the disclosed system perform a task related to front-end development, the disclosed system selects one or more computer agents from the second subset of computer agents that are predetermined to perform tasks related to front-end web development. Other subsets of computer agents from the plurality of computer agents may be configured to perform other tasks related to other task domains.

Each of the plurality of computer agents is associated with one or more keywords that indicate a task that the computer agent is determined to perform. The disclosed system uses these keywords to predict which of one or more computer agents may be selected to perform a task requested by a user, as described below. For example, assume that a user requests the disclosed system to perform a particular task by conversing with the primary computer or conversation agent. The disclosed system receives an audio signal representing the speech of the user. The term "audio signal" may interchangeably be referred to as voice signal or speech herein. The audio signal includes one or more utterances indicating the particular task. The disclosed system extracts a set of features from the audio signal. The set of features represents a first set of keywords indicating the particular task. The set of features may further represent contextual data associated with the audio signal, such as a time range, tone (e.g., sense of urgency, by detecting utterances, such as "as soon as possible," "urgent," "important," etc.), an entity associated with the particular task (e.g., an organization), and/or other contextual data. The disclosed system compares the first set of keywords (associated with the user's request) with a plurality of keywords associated with the plurality of computer agents.

The disclosed system determines which of one or more computer agents from the plurality of computer agents are predetermined to perform the particular task based on the comparison between the first set of keywords and the plurality of keywords. For example, assume that the disclosed system determines that the first set of keywords associated with the user's request corresponds to (or correspond to more than a threshold percentage of) a second set of keywords associated with a first computer agent from the plurality of computer agents. Thus, in this example, the disclosed system executes the first computer agent to perform the particular task requested by the user. In another example, assume that the disclosed system determines that the first set of keywords associated with the user's request corresponds to (or correspond to more than a threshold percentage of) a second set of keywords associated with a first computer agent and a third set of keywords associated with a second computer agent from the plurality of computer agents. Thus, in this example, the disclosed system executes the first and second computer agents to perform the particular task requested by the user.

In one embodiment, a system for identifying computer agents for performing a particular task comprises a memory and a processor. The memory is operable to store a plurality of computer agents associated with a plurality of keywords. Each computer agent from the plurality of computer agents is predetermined to perform a different task. Each computer agent from the plurality of computer agents is associated with one or more different keywords indicating each different task. The plurality of computer agents comprises a first computer agent that is associated with at least a first keyword indicating a first task that the first computer agent is predetermined to perform. The processor is operably coupled with the memory. The processor receives a first audio signal to perform a first particular task, where the first audio signal comprises a first request to perform the first particular task. The processor extracts a first set of features from the first audio signal, where the first set of features represents at least a second keyword indicating the particular task. The processor determines which of one or more computer agents from the plurality of computer agents is predetermined to perform the first particular task by comparing the second keyword with the plurality of keywords comprising comparing the second keyword with the first keyword. The processor determines whether the first keyword corresponds to the second keyword. In response to determining that the first keyword corresponds to the second keyword, the processor executes the first computer agent to perform the first particular task.

The disclosed system provides several practical applications and technical advantages, which include: 1) technology that configures or trains each computer agent to perform a different task, where training each computer agent to perform a particular task comprises using different training datasets comprising different lexicons of keywords related to the different task, for example, a first computer agent may be trained by a first training dataset that comprises a first lexicon comprising a first set of keywords related to a first task, a second computer agent may be trained by a second training dataset that comprises a second lexicon comprising a second set of keywords related to a second task, and so on; 2) technology that extracts a set of features from an audio signal representing speech of a user, where the set of features represent a first set of keyword indicating a particular task; 3) technology that predicts which of one or more computer agents from a plurality of computer agents are predetermined to perform the particular task requested by the user based on comparing the first set of keywords determined from the extracted set of features with a plurality of keywords associated with the plurality of computer agents; and 4) technology that executes one or more computer agents whose keywords correspond to the first set of keywords determined from the extracted set of features.

As such, the disclosed system may improve the current speech signal processing and machine-to-human conversation technologies, for example, by training each computer or conversation agent with a different training data set comprising a different lexicon of keywords associated with a different task, such that each computer agent is configured to perform a different task. For example, upon detecting that a particular task requested by a user is associated with a first set of keywords, the disclosed system selects one or more computer agents that are predetermined to perform the particular task, and executes the one or more computer agents to converse with the user. Thus, the executed computer agents can detect and "understand" utterances in the speech of the user related to the particular task, and therefore, can perform the particular task.

Accordingly, the disclosed system may be integrated into a practical application of recognizing, interpreting, and processing audio signals, e.g., received from a user, and allowing the user of a system that generates textual information (e.g., keywords) to interact with a voice or speech processing system that is configured to receive audio signals as input. Thus, the disclosed system may transform the received audio signal to textual information, e.g., using audio signal processing, natural language processing, etc.

The disclosed system may further be integrated into an additional practical application of creating an improved machine-to-human conversation system by implementing one or more particular conversation agents that are predetermined to perform a task requested by a user (e.g., either in form of an audio signal or text), and converse with the user about the task. Similarly, the disclosed system may further be integrated into an additional practical application of creating an improved machine-to-machine conversation (and/or communication) system by implementing, by a first machine, one or more particular computer agents that are predetermined to perform a task requested by a second machine (either in form of an audio signal, text, or code), and converse or communicate with the second machine.

The disclosed system may further be integrated into an additional practical application and technical improvement over current technologies by providing the user access to a plurality of conversation agents, each predetermined to perform a different task, and executing a conversation agent configured to perform a task requested by the user, and converse with the user about the task.

The disclosed system may further be integrated into an additional practical application of improvement in performing the particular task requested by the user, at least because a computer agent that is configured to perform the particular task is selected to do so.

The disclosed system may be integrated into an additional practical application of improving underlying operations of computing devices tasked to process a task requested by a user, and perform the task. This, in turn, provides additional practical applications including ease of use, fewer resources needed, faster implementation and response, and more accurate communication with the conversation agents. For example, the disclosed system may decrease processing, memory, and time resources spent in processing and performing the task that would otherwise be spent using the current speech signal processing and machine-to-human conversation technologies. For example, using the current speech signal processing and machine-to-human conversation technologies, the user may have to have a longer conversation with a conversation agent to convey the particular task to the conversation agent, and because the conversation agent is not configured to "understand" and perform the particular task, the conversation agent spends more processor and memory resources compared to the disclosed system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for computer agent selection. This disclosure provides various systems and methods for computer agent selection based on processing contextual data from speech. In one embodiment, system 100 and method 200 for computer agent selection based on processing contextual data from the speech are described in FIGS. 1 and 2, respectively.

Figure 1:
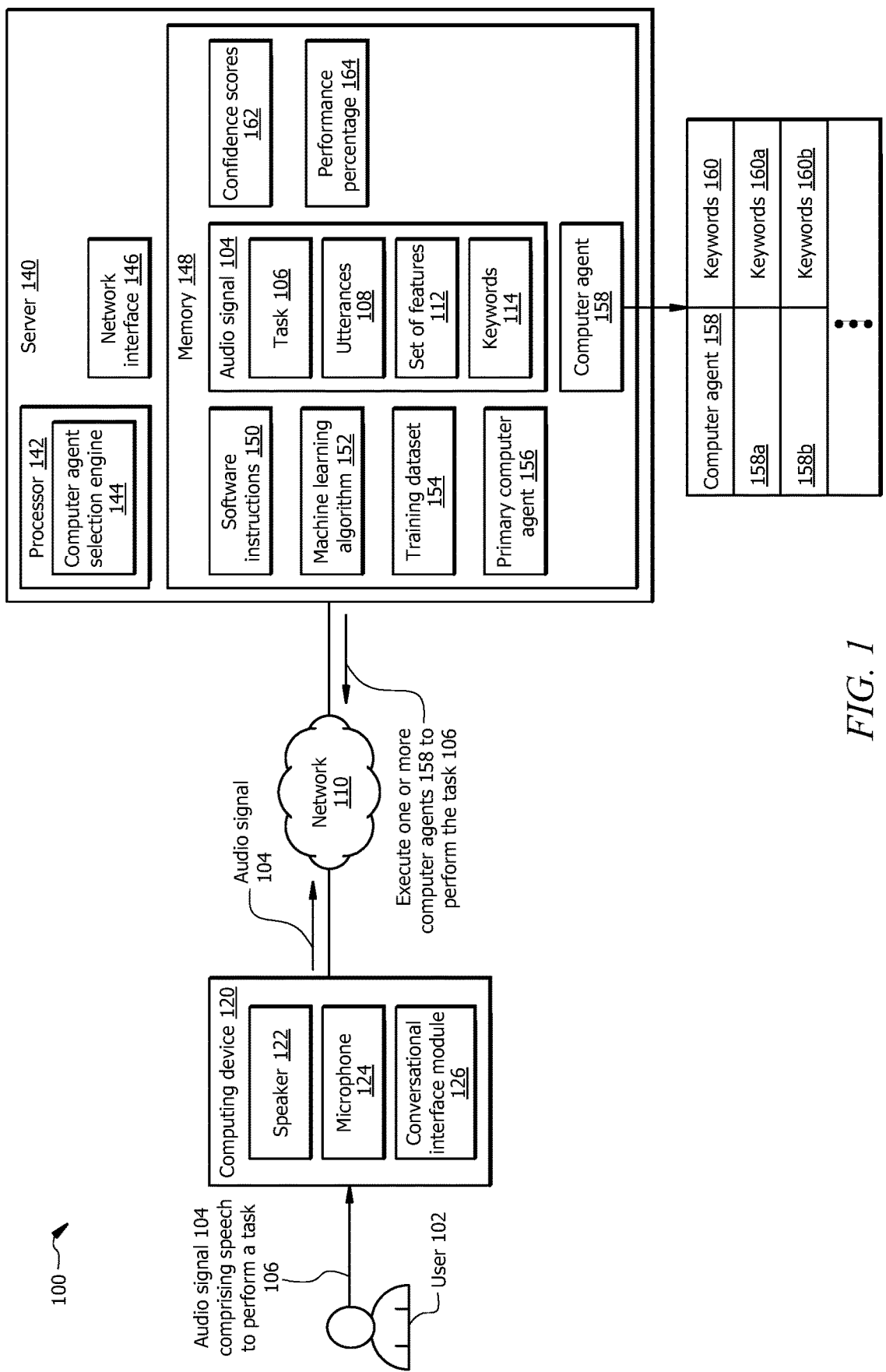
FIG. 1 illustrates an embodiment of a system configured for computer agent selection based on processing contextual data from speech.

Example System for Computer Agent Selection Based on Processing Contextual Data from Speech FIG. 1 illustrates one embodiment of a system 100 that is configured for selecting one or more computer agents 158 to perform a particular task 106 based on processing contextual data extracted from an audio signal 104. In one embodiment, system 100 comprises a server 140. In some embodiments, system 100 further comprises a network 110 and a computing device 120. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes a computer agent selection engine 144 to determine which one or more computer agents 158 are predetermined to perform a particular task 106, and execute the determined one or more computer agents 158 to perform the particular task 106. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

The computing device 120 is associated with or includes a speaker 122, a microphone 124, and a conversational interface module 126. The user 102 can interact or converse with the conversational interface module 126 using the microphone 124. The conversational interface module 126 is configured to respond using the speaker 122.

The conversational interface module 126 may be implemented by a software and/or a hardware processor. The conversational interface module 126 may be executed by the processor of the computing device 120 executing software instruction stored in the memory of the computing device 120. The conversational interface module 126 is in signal communication with the primary computer agent 156 and processor 142 via the network 110. The processor 142 may deploy or install the conversational interface module 126 on the computing device 120 in order to interact with the user 102. For example, the user 102 may converse with the conversational interface module 126 indicating that the user 102 asks the primary computer agent 156 to perform a task 106. In one example, the user 102 may ask the primary computer agent 156 to perform an accounting task 106. For example, the user may ask (via the conversational interface module 126) the primary computer agent 156 an accounting question. In some examples, the user 102 may ask the primary computer agent 156 to provide information about any topic, such as designing a website, weather in a particular location at a particular time range, traffic on a particular road, etc. For example, the user 102 may ask (via the conversational interface module 126) ask the primary computer agent 156 questions about a particular topic, including those listed above. In another example, the user 102 may ask the primary computer agent 156 to perform a transaction, e.g., purchase an item from a particular website. In another example, the user 102 may ask the primary computer agent 156 to access an account of the user 102 and place a limit buy order on a stock associated with a particular entity (e.g., organization). In another example, the user 102 may ask the primary computer agent 156 to access an account of the user 102 and place a limit sell order on a stock associated with a particular entity (e.g., organization). In another example, the user 102 may ask the primary computer agent 156 to disclose a transaction history associated with a particular entity (e.g., organization) in a particular time range.

In any of the examples listed above, the primary computer agent 156 receives an audio signal 104 comprising speech of the user 102 indicating to perform a particular task 106, and forwards the audio signal 104 to the computer agent selection engine 144 to determine which of one or more computer agents 158 are predetermined to perform the particular task 106. As used herein, "speech" or audio signal 104 may include spoken audio utterances 108 as well as non-spoken audio utterances 108 and information such as audible tones, signals, or sounds that may have meaning or significance that is commonly recognized or at least mutually agreed upon among communicating parties. For example, sounds of laughter or other familiar audible sounds may communicate information or express thoughts and emotions. In some embodiment, system 100 may advantageously include various aspects of recognizing, interpreting, and producing such sounds as a way of enhancing communications among parties. The process of selection of one or more computer agents 158 is described below in conjunction with the operational flow of the system 100 and method 200 described in FIG. 2.

Server

Server 140 is generally a server or any other device configured to process data and communicate with computing devices (e.g., computing device 120), databases, etc., via the network 110. The server 140 is generally configured to oversee the operations of the computer agent selection engine 144, as described further below in conjunction with an operational flow of system 100 and method 200 described in FIG. 2.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the computer agent selection engine 144, primary computer agent 156, and computer agents 158. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-2. For example, the processor 142 may be configured to perform one or more steps of method 200 as described in FIG. 2.

Network interface 146 is configured to enable wired and/or wireless communications (e.g., via network 110). The network interface 146 is configured to communicate data between the server 140 and other devices (e.g., computing device 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, machine learning algorithm 152, training dataset 154, primary computer agent 156, audio signal 104, computer agents 158, confidence scores 162, performance percentage 164, and/or any other data or instructions. The software instructions 150 may comprise any suitable set of instructions, logic, rules, or code operable to execute the processor 142.

Computer Agent

Each computer agent 158 may be implemented by the processor 142 executing the software instructions 150. Likewise, the primary computer agent 156 may be implemented by the processor 142 executing the software instructions 150. Each computer agent 158 is predetermined to perform a different task 106. For example, each computer agent 158 may be programmed to perform a different task 106. Each computer agent 158 may be configured to perform commands indicated in different task 106.

Each computer agent 158 is associated with one or more different keywords 160 indicating each different task 106. For example, the first computer agent 158a is associated with (or identified by) one or more keywords 160a indicating a first task 106, the second computer agent 158b is associated with (or identified by) one or more keywords 160b indicating a second task 106, and so on.

In one embodiment, each computer agent 158 may be configured to perform its corresponding task 106 as well as interact (or converse) with the user 102. For example, each computer agent 158 may comprise a conversational agent that is configured to converse with the user 102. For example, each computer agent 158 may be trained based on a particular lexicon that includes keywords related to a particular task 106 that the computer agent 158 is predetermined to perform, to increase the accuracy of detecting utterances 108 from an audio signal 104 in which the particular task 106 is requested, where the utterances 108 may include keywords 114 related to the particular task 106. Thus, a particular computer agent 158 may "understand" and detect utterances 108 that are related to a particular task 106 that the particular computer agent 158 is configured to perform. In this manner, each computer agent 158 may be configured to converse with the user 102 about the particular task 106, and detect utterances 108 that include keywords 114 related to the particular task 106.

Once a computer agent 158 is selected (by the computer agent selection engine 144) to perform the task 106, the primary computer agent 156 may execute the selected computer agent 158, so that the selected computer agent 158 and/or the primary computer agent 156 can perform the requested task 106 and converse with the user 102. This process of selecting one or more computer agents 158 is described further below in conjunction with the operational flow of system 100 and method 200 described in FIG. 2.

Computer Agent Selection Engine

Computer agent selection engine 144 may be implemented by the processor 142 executing the software instructions 150, and is generally configured to select one or more computer agents 158 to perform a particular task 106, e.g., specified in an audio signal 104 that comprises a speech of a user 102.

In one embodiment, the computer agent selection engine 144 may be implemented by a machine learning algorithm 152. For example, the machine learning algorithm 152 may comprise support vector machine, neural network, random forest, k-means clustering, etc. The machine learning algorithm 152 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 152 may be implemented by Natural Language Processing (NLP). In another example, the machine learning algorithm 152 may be implemented by analog signal processing, digital signal processing, speech signal processing, signal quantization, signal frequency sampling, among others. The operation of the computer agent selection engine 144 is described below in conjunction with the operational flow of the system 100 and method 200 described in FIG. 2.

In brief, the computer agent selection engine 144 (by implementing the machine learning algorithm 152) is configured to extract a set of features 112 from a received audio signal 104, and determine or extract one or more keywords 114 from the extracted features 112. The computer agent selection engine 144 compares the one or more keywords 114 with a plurality of keywords 160 associated with the plurality of computer agents 158, e.g., by implementing an NLP algorithm. The computer agent selection engine 144 selects one or more computer agents 158 from the plurality of computer agents 158 whose keywords 160 (or more than a threshold percentage of their keywords 160) correspond to the keywords 114.

The computer agent selection engine 144 may be trained by a training dataset 154. In one embodiment, the training dataset 154 may include a plurality of computer agents 158 each labeled with different keywords 160. The computer agent selection engine 144 may classify one or more first computer agents 158 in a first task domain class indicating that the one or more first computer agents 158 are predetermined to perform a first task 106. Similarly, the computer agent selection engine 144 may classify one or more second computer agents 158 in a second task domain class indicating that the one or more second computer agents 158 are predetermined to perform a second task 106. The computer agent selection engine 144 may classify the other computer agents 158 in other task domain classes indicating other tasks 106 that the other computer agents 158 are predetermined to perform. The tasks 106 may include any topic, including web development, software development, mobile application development, accounting, obtaining weather data, obtaining traffic data, performing a transaction, among others.

In one example, the task 106 may include parsing a particular website to find information about a particular topic. For example, the audio signal 104 may include "find information about top programming languages for front-end web development." In this example, the computer agent selection engine 144 may select one or more computer agents 158 that are predetermined to perform parsing and web browsing. For example, the computer agent selection engine 144 may determine one or more keywords 114 in a received audio signal 104 that are related to and/or include "parsing," "web surfing," "web browsing," and/or the like. As such, the computer agent selection engine 144 may determine that one or more computer agents 158 that are associated with keywords 160 including and/or related to "parsing," "web surfing," "web browsing," and/or the like.

In another example, the task 106 may include composing an email message or text message. For example, the audio signal 104 may include "I want to send an email to this email address." In this example, the computer agent selection engine 144 may select one or more computer agents 158 that are predetermined to perform speech processing, navigating a messaging application, and composing a message. For example, the computer agent selection engine 144 may determine one or more keywords 114 in a received audio signal 104 that are related to and/or include "email message," "text message," "composing," "text analysis," "speech analysis," and/or the like. As such, the computer agent selection engine 144 may determine that one or more computer agents 158 that are associated with keywords 160 including and/or related to "email message," "text message," "composing," "text analysis," "speech analysis," and/or the like.

The computer agent selection engine 144 may be implemented by supervised, semi-supervised, and/or unsupervised machine learning algorithm 152. For example, during the training process of the computer agent selection engine 144, the computer agent selection engine 144 may be given an audio signal 104 comprising utterances 108 in which a particular task 106 is specified, where the audio signal 104 is labeled with one or more particular computer agents 158 that are predetermined to perform the particular task 106. The computer agent selection engine 144 is asked to predict which of one or more computer agents 158 are predetermined to perform the particular task 106 indicated in the audio signal 104.

The computer agent selection engine 144 extracts a set of features 112 from the audio signal 104. From the set of features 112 and utterances 108, the computer agent selection engine 144 determines keywords 114. The computer agent selection engine 144 compares the keywords 114 with the plurality of keywords 160. The computer agent selection engine 144 predicts one or more computer agents 158 that are associated with keywords 160 that correspond to (or correspond to more than a threshold percentage of) the keywords 114. The computer agent selection engine 144 determines a confidence score 162 indicating a percentage of keywords 160 that correspond to the keywords 114. The confidence score 162 may further indicate a probability of the keywords 160 corresponding to the keywords 114. If it is determined that the confidence score 162 is more than a threshold percentage (e.g., more than 80%, 85%, etc.), the computer agent selection engine 144 determines that this prediction is accurate, and the executes the predicted one or more computer agents 158 to perform the particular task 106. If it is determined that the confidence score 162 is less than the threshold percentage, the computer agent selection engine 144 adjusts one or more weight and bias values associated with the features 112 and/or the neural network layers of the machine learning algorithm 152.

During the testing process, the computer agent selection engine 144 is given an unlabeled audio signal 104 and is asked to predict one or more computer agents 158 to perform a task specified in the audio signal 104. The computer agent selection engine 144 extracts a set of features 112 from the audio signal 104, determines keywords 114 indicating the task 106, and compares the keywords 114 with keywords 160, similar to that described above. The computer agent selection engine 144 predicts one or more computer agents 158 to perform the task 106, and executes the predicted computer agents 158.

In one embodiment, during the training and/or testing processes, upon receiving an audio signal 104, the computer agent selection engine 144 may execute a plurality of computer agents 158 and determine a plurality of confidence scores 162. In one embodiment, the computer agent selection engine 144 may select one or more computer agents 158 to perform the task 106, whose confidence scores 162 are more than a threshold percentage. In one embodiment, the computer agent selection engine 144 may select a particular computer agent 158 whose confidence score 162 is the highest among the confidence scores 162.

The computer agent selection engine 144 may receive feedback from the user 102 indicating a performance percentage 164 of the predicted computer agents 158 completing the task 106. If it is determined that the performance percentage 164 is less than a threshold performance percentage (e.g., %75, 80%, etc.), the computer agent selection engine 144 adjusts one or more weight and bias values associated with the features 112 and/or the neural network layers of the machine learning algorithm 152.

Operational Flow

Extracting Features from an Audio Signal

The operational flow of system 100 begins when the computer agent selection engine 144 receives a first audio signal 104, where the first audio signal 104 comprises utterances 108 indicating to perform a first particular task 106. The first audio signal 104 includes a first request to perform the first particular task 106. The computer agent selection engine 144 extracts a set of features 112 from the first audio signal 104. For example, the set of features 112 may represent keywords 114 indicating the first particular task 106, a first time range, a first entity, etc. In another example, the set of features 112 may represent contextual data extracted from the first audio signal 104, such as sense of urgency by detecting one or more utterances 108, including "as soon as possible," "urgent," "important," etc. The computer agent selection engine 144 may extract the set of features 112 by implementing the machine learning algorithm 152 including the audio signal processing algorithm. The set of features 112 may be represented by a first vector that comprises a first set of numerical values.

By implementing the machine learning algorithm 152, the computer agent selection engine 144 determines utterances 108 from the first audio signal 104. The utterances 108 may specify the task 106 and other contextual data. The computer agent selection engine 144 may process the utterances 108 (by audio signal processing algorithm) to extract the set of features 112 and determine the keywords 114.

Determining One or More Computer Agents to Perform a Task Specified in the Audio Signal The computer agent selection engine 144 compares the keywords 114 with the keywords 160. The computer agent selection engine 144 determines which one or more of the computer agents 158 are predetermined to perform the particular task 106 by determining which keywords 160 correspond to (or correspond to more than a threshold percentage of) the keywords 114.

In one example, assume that the computer agent selection engine 144 has extracted a first keyword 114 from the first audio signal 104. Also, assume that the computer agent selection engine 144 determines that the first keyword 114 corresponds to the keyword 160a. Thus, in this example, the computer agent selection engine 144 executes the computer agent 158a to perform the particular task 106. In this process, the computer agent selection engine 144 and/or the primary computer agent 156 may implement the computer agent 158a to perform the particular task 106 and/or converse with the user 102 about the particular task 106. The computer agent selection engine 144 may deploy or communicate the computer agent 158a to the computing device 120, such that the conversational interface module 126 can implement or execute the computer agent 158a. The process of determining whether the first keyword 114 corresponds to the second keyword 160a is described below.

For example, assume that the first keyword 114 is represented by a first set of features 112, and the first set of features 112 is represented by a first vector comprising a first set of numerical values. The second keyword 160a is represented by a set of features (extracted by the computer agent selection engine 144 by implementing the machine learning algorithm 152), and the set of features is represented by a second vector comprising a second set of numerical values.

The computer agent selection engine 144 compares each numerical value of the first vector with a counterpart numerical value of the second vector. The computer agent selection engine 144 determines whether each numerical value of the first vector corresponds to the counterpart numerical value of the second vector. In one example, the computer agent selection engine 144 determines that the first keyword 114 corresponds to the second keyword 160a, if the computer agent selection engine 144 determines that more than a threshold percentage of the first set of numerical values correspond to their counterpart numerical values from the second set of numerical values. In another example, the computer agent selection engine 144 determines that the first keyword 114 corresponds to the second keyword 160a, if the computer agent selection engine 144 determines that more than a threshold percentage of the first set of numerical values are within a threshold range (e.g., ±5%, ±10%, etc.) from their counterpart numerical values from the second set of numerical values.

In another example, assume that the computer agent selection engine 144 has received a second audio signal 104, where the second audio signal 104 includes a second request and utterances 108 to perform a second particular task 106. The computer agent selection engine 144 extracts a second set of features 112 from the second audio signal 104, where the second set of features 112 represents a second set of keywords 114 indicating the second particular task 106. The second set of features 112 may further represent contextual data associated with the second audio signal 104 including the second particular task 106, a time range, and an entity associated with the second particular task 106.

The computer agent selection engine 144 determines which of one or more computer agents 158 are predetermined to perform the second particular task 106 by comparing the second set of keywords 114 with the plurality of keywords 160. In this process, the computer agent selection engine 144 dreaminess a percentage of keywords 114 from the second set of keywords 114 that correspond to (or correspond to more than the threshold percentage of) each set of keywords 160, including keywords 160b.

For example, with respect to comparing the second set of keywords 114 with the keywords 160b, the computer agent selection engine 144 determines whether the percentage of keywords 114 from the second set of keywords 114 that correspond to (or correspond to more than the threshold percentage of) keywords 160b is more than a threshold percentage (e.g., more than 80%, 85%, etc.). If the computer agent selection engine 144 determines that the percentage of keywords 114 from the second set of keywords 114 that correspond to (or correspond to more than the threshold percentage of) keywords 160b is more than a first threshold percentage, the computer agent selection engine 144 executes the computer agent 158b. Thus, in this example, the computer agent selection engine 144 and/or the primary computer agent 156 execute the computer agent 158b to perform the second particular task 106 indicated in the second audio signal 104 and/or converse with the user 102. The computer agent selection engine 144 may deploy or communicate the computer agent 158b to the computing device 120, such that the conversational interface module 126 can implement or execute the computer agent 158b.

In another example, assume that the computer agent selection engine 144 has received a third audio signal 104, where the third audio signal 104 includes a third request and utterances 108 to perform a third particular task 106. The computer agent selection engine 144 extracts a third set of features 112 from the third audio signal 104. The third set of features 112 may represent a third set of keywords 114 indicating contextual data associated with the third audio signal 104. The contextual data associated with the third audio signal 104 may include the third particular task 106, a time range, and an entity related to the third particular task 106.

The computer agent selection engine 144 determines which of one or more computer agents 158 are predetermined to perform the third particular task 106 by comparing the third set of keywords 114 with the plurality of keywords 160. For example, assume that computer agent selection engine 144 determines that the third set of keywords 114 corresponds to (or corresponds to more than a threshold percentage of) the keyword(s) 160a and keywords 160b. In another example, assume that the computer agent selection engine 144 determines the third set of keywords 114 corresponds to the keyword 160a and more than a threshold percentage (e.g., more than 80%, 85%, etc.) of the keywords 160b. In any of these examples, the computer agent selection engine 144 and/or the primary computer agent 156 execute the computer agents 158a and 158b to perform the third particular task 106 indicated in the third audio signal 104 and/or converse with the user 102. The computer agent selection engine 144 may deploy or communicate the computer agents 158a and 158b to the computing device 120, such that the conversational interface module 126 can implement or execute the computer agents 158a and 158b.

In one embodiment, system 100 may be further configured to receive a request to perform a task 106 from the user 102 in other forms, such as text. As such, the computer agent selection engine 144 may process the text, extract a set of features 112 from the text, and determine one or more keywords 114 from the text, e.g. by implementing a natural language processing algorithm.

In one embodiment, system 100 may further be configured to receive a request to perform a task 106 from a machine, e.g., a computing device 120. For example, the system 100 may receive the request in form of an audio signal 104 (uttered by the computing device 120), text, code, etc. As such, the computer agent selection engine 144 may process the received data, extract a set of features 112 from the received data, and determine one or more keywords 114 from the received data, e.g., by implementing audio signal processing, natural language processing algorithm, text processing, code processing, etc. Thus, system 100 may improve machine-to-machine communication and/or conversation technologies.

Example Method for Computer Agent Selection for Performing a Particular Task

Figure 2:
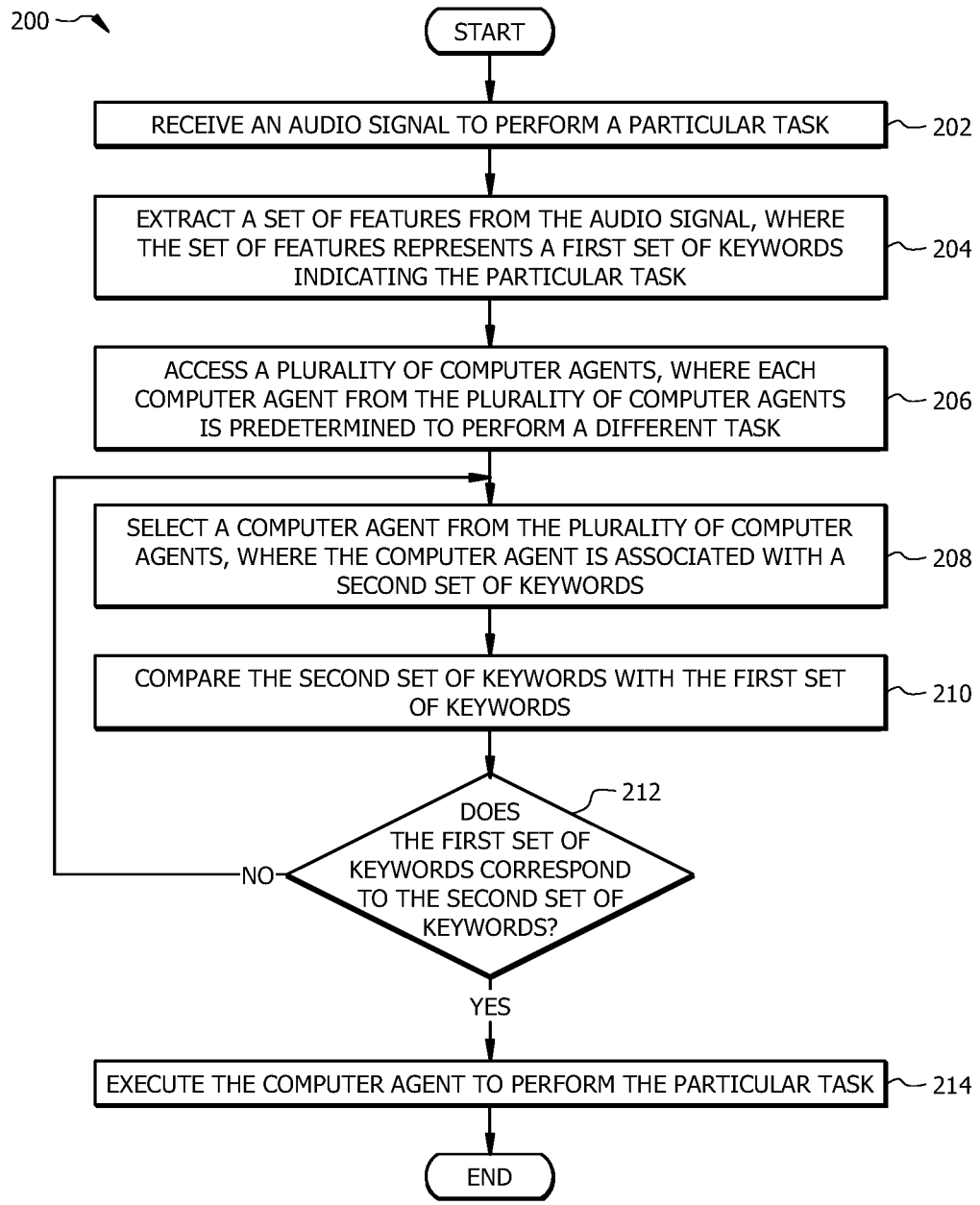
FIG. 2 illustrates an example flowchart of a method for computer agent selection based on processing contextual data from speech.

FIG. 2 illustrates an example flowchart of a method 200 for computer agent selection for performing a particular task 106. Modifications, additions, or omissions may be made to method 200. Method 200 may include more, fewer, or other steps. For example, steps may be performed in parallel or in any suitable order. While at times discussed as the system 100, processor 142, computer agent selection engine 144, primary computer agent 156, one or more computer agents 158, computing device 120, conversational interface module 126, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-214.

Method 200 begins at step 202 where the computer agent selection engine 144 receives an audio signal 104 to perform a particular task 106. For example, the computer agent selection engine 144 may receive the audio signal 104 when the user 102 converses with the conversational interface module 126 by uttering the utterances 108. The speech of the user 102 (i.e., the audio signal 104) is captured by the microphone 124 and forwarded to the conversational interface module 126. The conversational interface module 126 is in signal communication with the server 140, the processor 142, computer agent selection engine 144, primary computer agent 156, and the computer agents 158. The conversational interface module 126 communicates the audio signal 104 to the server 140 to be processed by the processor 142 and/or the computer agent selection engine 144. The audio signal 104 comprises a request and one or more utterances 108 that indicate the particular task 106.

At step 204, the computer agent selection engine 144 extracts a set of features 112 from the audio signal 104, where the set of features 112 represents a first set of keywords 114. For example, the computer agent selection engine 144 executes the machine learning algorithm 152 to extract the set of features 112, similar to that described above in FIG. 1. The set of features 112 may further represent contextual data associated with the audio signal 104, such as the particular task 106, a time range, a tone (e.g., sense of urgency, etc.), an entity associated with the particular task 106, and/or any other contextual data.

At step 206, the computer agent selection engine 144 accesses a plurality of computer agents 158, where each computer agent 158 from the plurality of computer agents 158 is predetermined to perform a different task 106. For example, the computer agent selection engine 144 access the plurality of computer agents 158 stored in the memory 148.

At step 208, the computer agent selection engine 144 selects a computer agent 158 from the plurality of computer agents 158, where the computer agent 158 is associated with the second set of keywords 160. For example, assume that the computer agent selection engine 144 selects the first computer agent 158a, where the first computer agent 158a is associated with the keywords 160a. In one embodiment, the computer agent selection engine 144 may iteratively select a computer agent 158 until no more computer agent 158 is left for evaluation. In another embodiment, the computer agent selection engine 144 may iteratively select a computer agent 158 until one or more computer agents 158 whose keywords 160 correspond to (or correspond to more than a threshold percentage of) the first set of keywords 114 are selected.

At step 210, the computer agent selection engine 144 compares the second set of keywords 160a with the first set of keywords 114. In this process, the computer agent selection engine 144 may identify a first set of numerical values of a first vector that represents the first set of features 112, including the first set of keywords 114, and a second set of numerical values of a second vector that represents the second set of keywords 160a. The computer agent selection engine 144 may compare each numerical value of the first vector with a counterpart numerical value of the second vector, similar to that described in FIG. 1.

At step 212, the computer agent selection engine 144 determines whether the first set of keywords 114 corresponds to the second set of keywords 160a.

The computer agent selection engine 144 may determine determines whether the first set of keywords 114 corresponds to the second set of keywords 160a, based on the comparison between the first set of keywords 114 and the second set of keywords 160a, described in step 210 and FIG. 1. For example, the computer agent selection engine 144 may determine that the first set of keywords 114 corresponds to the second set of keywords 160a, if the computer agent selection engine 144 determines that more than a threshold percentage keywords 114 (e.g., more than 80%, 85%, etc.) of the first set of keywords 114 correspond to the second set of keywords 160a. For each keyword 114, the computer agent selection engine 144 may determine that the keyword 114 corresponds to its counterpart keyword 160a by comparing the first vector of numerical values representing the keyword 114 with the second vector of numerical values representing the counterpart keyword 160a, similar to that described in FIG. 1. For example, the computer agent selection engine 144 may compare each numerical value of the first vector with its counterpart numerical value of the second vector. The computer agent selection engine 144 may determine that the keyword 114 corresponds to its counterpart keyword 160*a*, if the computer agent selection engine 144 determines that more than a threshold percentage of numerical values (e.g., more than 80%, 85%, etc.) of the first vector correspond to (or within a threshold range (e.g., ±5%, ±10%, etc.) their counterpart numerical values of the second vector. If the computer agent selection engine 144 determines that the first set of keywords 114 corresponds to the second set of keywords 160*a*, method 200 proceeds to step 214. Otherwise, method 200 returns to step 208.

At step 214, the computer agent selection engine 144 executes the computer agent 158*a* to perform the particular task 106. In this process, the computer agent selection engine 144 and/or the primary computer agent 156 may implement the computer agent 158*a* to perform the particular task 106 and/or converse with the user 102. For example, the computer agent selection engine 144 deploys or communicates the computer agent 158*a* to the computing device 120, such that the conversational interface module 126 can implement or execute the computer agent 158*a*. For example, the computer agent 158*a* may respond to the user 102 by providing an answer to the question of the user 102 related to the task 106 and perform the task 106.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for identifying computer agents to perform a particular task, comprising:
   a memory operable to store a plurality of computer agents associated with a plurality of keywords, wherein:
      each computer agent from the plurality of computer agents is predetermined to perform a different task;
      each computer agent from the plurality of computer agents is associated with one or more different keywords indicating each different task; and
      the plurality of computer agents comprises a first computer agent that is associated with at least a first keyword indicating a first task that the first computer agent is predetermined to perform; and
   a processor, operably coupled with the memory, and configured to:
      receive a first audio signal to perform a first particular task, wherein the first audio signal comprises a first request to perform the first particular task;
      extract a first set of features from the first audio signal, wherein the first set of features represents at least a second keyword indicating the first particular task;
      determine which of one or more computer agents from the plurality of computer agents is predetermined to perform the first particular task by comparing the second keyword with the plurality of keywords comprising comparing the second keyword with the first keyword;
      determine whether the first keyword corresponds to the second keyword; and
      in response to determining that the first keyword corresponds to the second keyword, execute the first computer agent to perform the first particular task;
   wherein:
   the plurality of computer agents further comprises a second computer agent associated with a first set of keywords indicating a second task that the second computer agent is predetermined to perform; and
   the processor is further configured to:
      receive a second audio signal to perform a second particular task, wherein the second audio signal comprises a second request to perform the second particular task;
      extract a second set of features from the second audio signal, wherein the second set of features represents a second set of keywords indicating the second particular task;
      determine which of one or more computer agents from the plurality of computer agents is predetermined to perform the second particular task by comparing the second set of keywords with the plurality of keywords comprising comparing the second set of keywords with the first set of keywords;
      determine a percentage of keywords from the second set of keywords that corresponds to the first set of keywords; and
      in response to determining that the percentage of keywords from the second set of keywords is more than a first threshold percentage, execute the second computer agent to perform the second particular task.

2. The system of claim 1, wherein the processor is further configured to:
   in response to executing the second computer agent to perform the second particular task, receive feedback indicating a performance percentage of the second computer agent completing the second particular task;
   in response to determining that the performance percentage is less than a threshold performance percentage, adjust one or more weight values associated with the second set of features; and
   identify another computer agent from the plurality of computer agents that is associated with a set of keywords, such that more than a first threshold percentage of keywords from the set of keywords corresponds to the second set of keywords.

3. The system of claim 1, wherein the processor is further configured to:

receive a third audio signal to perform a third particular task, wherein the third audio signal comprises a third request to perform the third particular task;

extract a third set of features from the third audio signal, wherein the third set of features represents a third set of keywords indicating contextual data associated with the third audio signal, comprising the third particular task, a time range, and an entity related to the third particular task;

determine which of one or more computer agents from the plurality of computer agents is predetermined to perform the third particular task by comparing the third set of keywords with the plurality of keywords comprising comparing the third set of keywords with the first keyword and the second set of keywords;

determine that the third set of keywords corresponds to the first keyword and more than a second threshold percentage of the second set of keywords; and in response to determining that the third set of keywords corresponds to the first keyword and more than the second threshold percentage of the second set of keywords, execute the first computer agent and the second computer agent to perform the third particular task.

4. The system of claim 3, wherein:

the first set of features is represented by a first vector comprising a first set of numerical values, the first keyword is represented by a fourth set of features;

the fourth set of features is represented by a second vector comprising a second set of numerical values; and determining whether the first keyword corresponds with the second keyword comprises:

comparing each numerical value of the first vector with a counterpart numerical value of the second vector;

determining whether each numerical value of the first vector corresponds to the counterpart numerical value of the second vector; and in response to determining that more than a threshold percentage of the first set of numerical values corresponds to the second set of numerical values, determining that the first keyword corresponds to the second keyword.

5. The system of claim 1, wherein the first particular task comprises requesting to perform an accounting task, requesting to provide information about designing a website, or requesting to provide information about weather of a particular location at a particular time range.

6. The system of claim 1, wherein the first computer agent comprises a first conversation agent that is configured to converse with a user.

7. A method for identifying computer agents to perform a particular task, comprising:

receiving a first audio signal to perform a first particular task, wherein the first audio signal comprises a first request to perform the first particular task;

extracting a first set of features from the first audio signal, wherein the first set of features represents at least a second keyword indicating the first particular task;

determining which of one or more computer agents from a plurality of computer agents is predetermined to perform the first particular task, wherein:

the plurality of computer agents are associated with a plurality of keywords;

each computer agent from the plurality of computer agents is predetermined to perform a different task;

each computer agent from the plurality of computer agents is associated with one or more different keywords indicating each different task;

the plurality of computer agents comprises a first computer agent that is associated with at least a first keyword indicating a first task that the first computer agent is predetermined to perform; and determining which of one or more computer agents from the plurality of computer agents is predetermined to perform the first particular task comprises comparing the second keyword with the plurality of keywords comprising comparing the second keyword with the first keyword;

determining whether the first keyword corresponds to the second keyword; and in response to determining that the first keyword corresponds to the second keyword, executing the first computer agent to perform the first particular task;

receiving a second audio signal to perform a second particular task, wherein the second audio signal comprises a second request to perform the second particular task;

extracting a second set of features from the second audio signal, wherein the second set of features represents a second set of keywords indicating the second particular task;

determining which of one or more computer agents from the plurality of computer agents is predetermined to perform the second particular task, wherein:

the plurality of computer agents further comprises a second computer agent associated with a first set of keywords indicating a second task that the second computer agent is predetermined to perform; and determining which of one or more computer agents from the plurality of computer agents is predetermined to perform the second particular task comprises comparing the second set of keywords with the plurality of keywords comprising comparing the second set of keywords with the first set of keywords;

determining a percentage of keywords from the second set of keywords that corresponds to the first set of keywords; and in response to determining that the percentage of keywords from the second set of keywords is more than a first threshold percentage, executing the second computer agent to perform the second particular task.

8. The method of claim 7, further comprising:

in response to executing the second computer agent to perform the second particular task, receiving feedback indicating a performance percentage of the second computer agent completing the second particular task;

in response to determining that the performance percentage is less than a threshold performance percentage, adjusting one or more weight values associated with the second set of features; and identifying another computer agent from the plurality of computer agents that is associated with a set of keywords, such that more than a first threshold percentage of keywords from the set of keywords corresponds to the second set of keywords.

9. The method of claim 7, further comprising:

receiving a third audio signal to perform a third particular task, wherein the third audio signal comprises a third request to perform the third particular task;

extracting a third set of features from the third audio signal, wherein the third set of features represents a third set of keywords indicating contextual data associated with the third audio signal, comprising the third particular task, a time range, and an entity related to the third particular task;

determining which of one or more computer agents from the plurality of computer agents is predetermined to perform the third particular task by comparing the third set of keywords with the plurality of keywords comprising comparing the third set of keywords with the first keyword and the second set of keywords;

determining that the third set of keywords corresponds to the first keyword and more than a second threshold percentage of the second set of keywords; and in response to determining that the third set of keywords corresponds to the first keyword and more than the second threshold percentage of the second set of keywords, executing the first computer agent and the second computer agent to perform the third particular task.

10. The method of claim 9, wherein:
the first set of features is represented by a first vector comprising a first set of numerical values,
the first keyword is represented by a fourth set of features;
the fourth set of features is represented by a second vector comprising a second set of numerical values; and
determining whether the first keyword corresponds with the second keyword comprises:
  comparing each numerical value of the first vector with a counterpart numerical value of the second vector;
  determining whether each numerical value of the first vector corresponds to the counterpart numerical value of the second vector; and
  in response to determining that more than a threshold percentage of the first set of numerical values corresponds to the second set of numerical values, determining that the first keyword corresponds to the second keyword.

11. The method of claim 7, wherein the first particular task comprises requesting to perform an accounting task, requesting to provide information about designing a website, or requesting to provide information about weather in a particular location at a particular time range.

12. The method of claim 7, wherein the first computer agent comprises a first conversation agent that is configured to converse with a user.

13. A non-transitory computer-readable medium storing instructions that when executed by a processor cause the processor to:
receive a first audio signal to perform a first particular task, wherein the first audio signal comprises a first request to perform the first particular task;
extract a first set of features from the first audio signal, wherein the first set of features represents at least a second keyword indicating the first particular task;
determine which of one or more computer agents from a plurality of computer agents is predetermined to perform the first particular task, wherein:
  the plurality of computer agents is associated with a plurality of keywords;
  each computer agent from the plurality of computer agents is predetermined to perform a different task;
  each computer agent from the plurality of computer agents is associated with one or more different keywords indicating each different task;
  the plurality of computer agents comprises a first computer agent that is associated with at least a first keyword indicating a first task that the first computer agent is predetermined to perform; and
  determine which of one or more computer agents from the plurality of computer agents is predetermined to perform the first particular task comprises comparing the second keyword with the plurality of keywords comprising comparing the second keyword with the first keyword;
determine whether the first keyword corresponds to the second keyword; and
in response to determining that the first keyword corresponds to the second keyword, execute the first computer agent to perform the first particular task;
receive a second audio signal to perform a second particular task, wherein the second audio signal comprises a second request to perform the second particular task;
extract a second set of features from the second audio signal, wherein the second set of features represents a second set of keywords indicating the second particular task;
determine which of one or more computer agents from the plurality of computer agents is predetermined to perform the second particular task, wherein:
  the plurality of computer agents further comprises a second computer agent associated with a first set of keywords indicating a second task that the second computer agent is predetermined to perform; and
  determining which of one or more computer agents from the plurality of computer agents is predetermined to perform the second particular task comprises comparing the second set of keywords with the plurality of keywords comprising comparing the second set of keywords with the first set of keywords;
determine a percentage of keywords from the second set of keywords that corresponds to the first set of keywords; and
in response to determining that the percentage of keywords from the second set of keywords is more than a first threshold percentage, execute the second computer agent to perform the second particular task.

14. The non-transitory computer-readable medium of claim 13, wherein the instructions further cause the processor to:
in response to executing the second computer agent to perform the second particular task, receive feedback indicating a performance percentage of the second computer agent completing the second particular task;
in response to determining that the performance percentage is less than a threshold performance percentage, adjust one or more weight values associated with the second set of features; and
identify another computer agent from the plurality of computer agents that is associated with a set of keywords, such that more than a first threshold percentage of keywords from the set of keywords correspond to the second set of keywords.

15. The non-transitory computer-readable medium of claim 13, wherein the instructions further cause the processor to:
receive a third audio signal to perform a third particular task, wherein the third audio signal comprises a third request to perform the third particular task;
extract a third set of features from the third audio signal, wherein the third set of features represents a third set of keywords indicating contextual data associated with the third audio signal, comprising the third particular task, a time range, and an entity related to the third particular task;

determine which of one or more computer agents from the plurality of computer agents is predetermined to perform the third particular task by comparing the third set of keywords with the plurality of keywords comprising comparing the third set of keywords with the first keyword and the second set of keywords;

determine that the third set of keywords corresponds to the first keyword and more than a second threshold percentage of the second set of keywords; and in response to determining that the third set of keywords corresponds to the first keyword and more than the second threshold percentage of the second set of keywords, execute the first computer agent and the second computer agent to perform the third particular task.

16. The non-transitory computer-readable medium of claim 15, wherein:

the first set of features is represented by a first vector comprising a first set of numerical values, the first keyword is represented by a fourth set of features;

the fourth set of features is represented by a second vector comprising a second set of numerical values; and determining whether the first keyword corresponds with the second keyword comprises:

comparing each numerical value of the first vector with a counterpart numerical value of the second vector;

determining whether each numerical value of the first vector corresponds to the counterpart numerical value of the second vector; and in response to determining that more than a threshold percentage of the first set of numerical values corresponds to the second set of numerical values, determining that the first keyword corresponds to the second keyword.

17. The non-transitory computer-readable medium of claim 13, wherein the first computer agent comprises a first conversation agent that is configured to converse with a user.

* * * * *